Jan. 13, 1959   E. F. HEIMBUCH   2,868,562
FACE SEAL MEANS
Filed Nov. 26, 1956
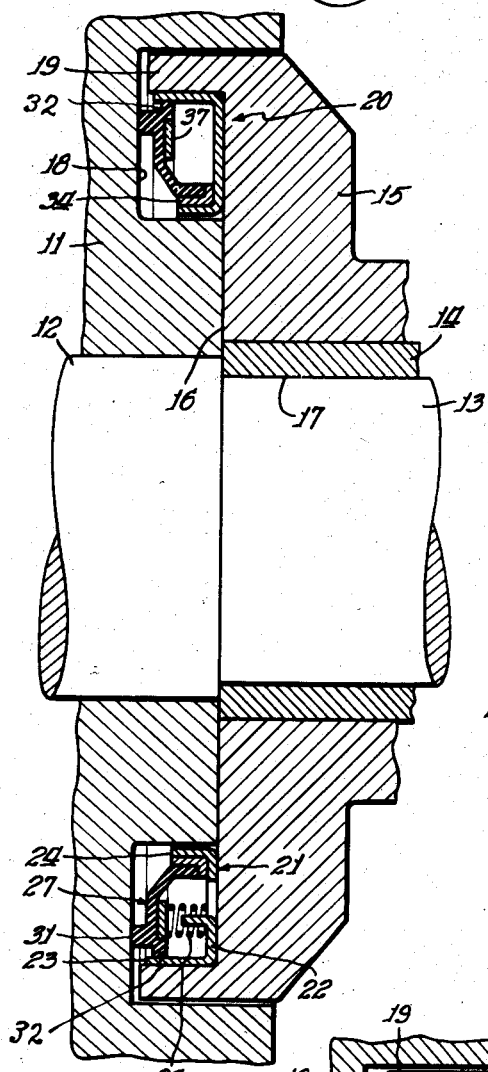
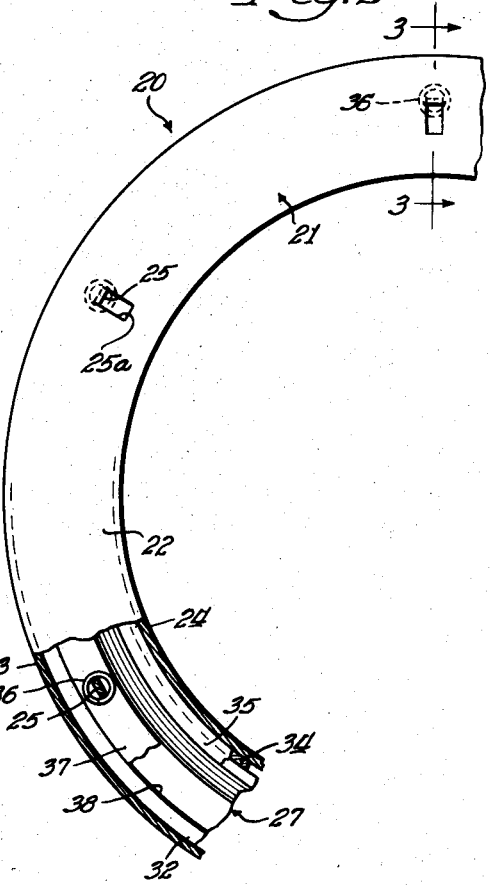
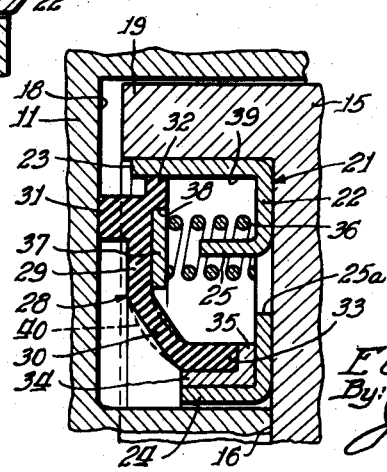
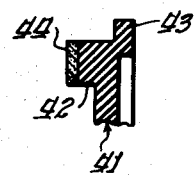
Inventor:
Elmer F. Heimbuch United States Patent Office 2,868,562
Patented Jan. 13, 1959

2,868,562

FACE SEAL MEANS

Elmer F. Heimbuch, Chicago Heights, Ill., assignor to Brummer Steel Company, Chicago Heights, Ill., a corporation of Illinois Application November 26, 1956, Serial No. 624,452

4 Claims. (Cl. 288—3)

This invention relates to face seal means for use especially in connection with truck frames of endless track type driving units as well as other heavy capacity tractors in which wheel-like elements are revolving, at relatively slow speeds, the purpose of the seal being to exclude dust, dirt, water and other foreign substances from the wheel bearing as well as to prevent the escape of lubricant therefrom.

Such rollers or wheels and the type of units heretofore mentioned are especially exposed in their operation to dirt which tends to work into the bearings and shafting upon which the rollers or wheels turn, causing highly objectionable wear and breakdown of parts. In addition to this it is also a difficult problem to maintain oil in the bearings for these elements.

An important object of the present invention is to supply an improved seal for this purpose of simple and relatively inexpensive construction which will function with enhanced efficiency and security.

An important object of the present invention is the provision of such a seal having a plurality of angularly related sealing lips that are self-adjustable, under the influence of relative movements of the parts, to maintain an efficient seal not only between the moving parts themselves but also to prevent entry of dust, dirt, water and the like to the interior of the seal itself.

These and other objects and advantages will be apparent from the following description, taken together with the accompanying drawings, showing an illustrative embodiment of the invention, and in which drawings—

Figure 1 is a sectional view showing the face seal means of the present invention applied to relatively rotatable elements;

Figure 2 is a separated fragmentary plan view of the face seal shown in Fig. 1;

Figure 3 is an enlarged quarter section of the seal means shown in Fig. 1 illustrating provision for expansion; and Figure 4 shows a modification.

Referring in detail to the illustrative embodiment and application thereof shown in the drawings, numeral 11 is one relatively rotatable element that rotates with shaft 12, the shaft having an integral extension 13 of reduced diameter that rotates in bushing 14 that is fixed in the other relatively rotatable element 15. As previously alluded to, elements 11 and 15 may be, for example, relatively rotatable parts of a tractor truck frame which is adapted to be subjected to heavy loads in environments exposing the truck to dust, dirt, water and other extraneous material which should desirably be kept away from the interface 16 between the relatively movable parts and from the bearing surface 17 between the shaft extension 13 and the bushing 14.

In accordance with the present invention, there is here shown for this purpose face seal means adapted to be located in an annular recess 18 in the member 11 into which enters an annular flange 19 on the member 15, said seal means being indicated generally by the numeral 20. Further in accordance with the present invention, the seal means 20 includes an enclosure here shown in the form of an annular cup-like casing 21, said casing having a radial wall 22 and first and second axially extending cylindrical concentric walls 23 and 24 respectively. At intervals spaced thereabout circumferentially, the radial wall 22 has a series of inwardly bent tangs or lugs 25 struck out therefrom leaving holes 25a, for a purpose presently explained.

Received in the cup-like casing 21 is an annulus 27 of elastomeric material, such as, for example, a synthetic rubber highly resistant to the action of heat, cold, dirt, water, oil, and other deleterious influences. The annulus 27 has a central web portion 28 that comprises a radial element 29 and an oblique element 30. The element 30 provides a distortable portion for the annulus. On one edge of the web portion 28 are a pair of integral annular lips, one of these lips 31 extending axially and another lip 32 extending radially. On the other edge of the web portion 28, the annulus 27 has a cylindrical portion 33 that has molded onto it a cylindrical rigid bushing 34, the bushing 34 here shown of metal, having a radial extension 35 that laps the end of the annulus cylindrical portion 33.

The loading bushing 34 has an inner diameter such that it makes a tight sliding engagement or drive fit with the second concentric wall 24 of the casing 21 when the annulus 27 is entered into the casing as shown in the drawing. Just before this is done, a series of compression springs 36, one impaled on each of the lugs 25, is arranged around the circumference of the casing to abut the annulus through the intermediation of an abutment ring 37 that may also be of metal. The annulus second lip 32 is desirably undercut as at 38 to locate the abutment ring 37 aligned with the spring 36 and with both the lips 31 and 32 of the annulus. The helical coil springs 36 urge the lips 31 and 32 outwardly of the casing and of course maintain a sealing engagement between the lip 31 and the adjacent rotatively movable face of the recess 18, compensating for relative axial movement of the parts 11 and 15 as well as wear on the lip 31.

Further in accordance with the present invention, the annulus 27 is molded slightly oversize so that the lip 32 makes a tight sealing, but nevertheless sliding, engagement with the inner face 39 of the casing first concentric wall 23. In order to insure this tight sealing engagement of the lip 32 on the face 39, the oblique portion 30 of the annulus 27 may actually be bowed slightly, or distorted, as indicated at 40 (Fig. 3) by the dotted lines when the annulus is inserted in the casing, this distortion however being so slight that it is not here shown in full lines and the dotted lines may in fact be an exaggeration. By reason of such slight desirable oversize fit, the lip 32 can follow the movement of the lip 31, under the influence of the rotatable part 11 on one side of the seal and the spring 36 on the other side of the seal, to maintain a sealing engagement with the inner face 39 of the first cylindrical wall 23 of the casing 20, during relative movements of the parts 11 and 15, for example, which movements may be slightly longitudinal as well as rotative. In other words, the annular lip 32 remains always in sealing engagement with the casing face 39, moving axially thereon to accommodate movements of the lip 31 due to relative axial movements of the parts or due to wear on the lip 31. As the lip 32 moves outwardly the web portion 30 of the elastomeric annulus 27, if bowed slightly as at 40, straightens out, and vice versa if the lip moves inwardly, thus compensating for such movement without loss of sealing contact, and providing a wiping action.

So constructed and arranged, entrance of dust, dirt, water and the like to the interface 16 and the bearing 17 is prevented by the seal here shown and described as well as entrance of such extraneous substances into the interior of the cup casing 21, thereby avoiding interference with the operation of the annulus 27 and avoiding jamming or rusting of the springs 36.

A modification is shown in Fig. 4 in which the elastomeric annulus 41 has first and second lips 42 and 43 corresponding to the lips 31 and 32 and carries a sealing washer 44 on the lip 42 to make sealing engagement with the face 18 of the member 11. The washer 44 may be of marked anti-friction character formed, say, of a phenolic condensation product impregnated with graphite, to provide a good rotative seal with the face 18. Such a washer may be desirable where the relative rotative speeds of the parts 11 and 15 are somewhat greater than contemplated in the use of the structure of Figs. 1 to 3 for example.

An illustrative embodiment of the invention having been disclosed, pursuant to statute, it is to be understood that such changes may be made, including modification of additions, as fall within the scope of the appended claims without departing from the invention.

What is here claimed is:

1. A face seal of the class described, comprising, an annulus of elastomeric material having an outer first web portion and an inner distortable web portion, a pair of angularly related annular lips extending outwardly from said first web portion, a first of said lips extending axially and a second of said lips extending radially, said second lip overhanging the first web portion to provide a radially inwardly facing shoulder, an abutment ring abutting the first web portion and said shoulder, a cylindrical portion extending inwardly from the inner web portion, an annular cup-like casing receiving said annulus, said casing having a radial wall and outer and inner concentric annular walls, said second lip having sliding sealing engagement with said outer concentric wall, spring means interposed between the casing radial wall and said abutment ring urging the lips axially of the casing, and means sealing the cylindrical portion of the annulus on the inner concentric wall.

2. The structure of claim 1 wherein the annulus cylindrical portion carries a molded-in loading bushing fitting tightly on the said inner concentric wall of the casing.

3. The structure of claim 1 wherein the spring means comprises a series of circumferentially spaced apart compression coil springs, the radial wall of the casing having inwardly struck lugs to locate the springs respectively.

4. The structure of claim 1 wherein the elastomeric annulus is molded oversize in relation to the casing to insure a continued tight fit in distortions of the web portion.

References Cited in the file of this patent
UNITED STATES PATENTS

| | | |
|---|---|---|
| 2,444,901 | Sloan | July 6, 1948 |
| 2,486,088 | Yaros | Oct. 25, 1949 |
| 2,572,422 | Agger | Oct. 23, 1951 |
| 2,608,425 | Krug | Aug. 26, 1952 |

FOREIGN PATENTS

| | | |
|---|---|---|
| 676,086 | Great Britain | July 23, 1952 |

UNITED STATES PATENT OFFICE

CERTIFICATE OF CORRECTION

Patent No. 2,868,562            January 13, 1959

Elmer F. Heimbuch

It is hereby certified that error appears in the above numbered patent requiring correction and that the said Letters Patent should read as corrected below.

In the grant, lines 2 and 12, and in the heading to the printed specification, line 4, name of assignee, for "Brummer Steel Company", each occurrence, read -- Brummer Seal Company --.

Signed and sealed this 21st day of April 1959.

(SEAL)
Attest:

KARL H. AXLINE
Attesting Officer

ROBERT C. WATSON
Commissioner of Patents